(12) United States Patent
Yoshida et al.

(10) Patent No.: US 9,876,271 B2
(45) Date of Patent: Jan. 23, 2018

(54) MOBILE COMMUNICATION DEVICE

(71) Applicant: Sony Corporation, Tokyo (JP)

(72) Inventors: Aiko Yoshida, Kanagawa (JP); Masato Tanaka, Chiba (JP); Hideaki Shoji, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/575,641

(22) Filed: Dec. 18, 2014

(65) Prior Publication Data
US 2016/0182694 A1    Jun. 23, 2016

(51) Int. Cl.
H04M 1/00     (2006.01)
H01Q 1/24     (2006.01)
H01Q 1/48     (2006.01)

(52) U.S. Cl.
CPC ............... H01Q 1/243 (2013.01); H01Q 1/48 (2013.01)

(58) Field of Classification Search
CPC ........................... H04W 40/24; H04M 1/0262
USPC .......... 455/575.7, 575.5, 90.3; 343/841, 867, 343/788, 848, 702; 333/132
See application file for complete search history.

(56) References Cited

U.S. PATENT DOCUMENTS

| | | | |
|---|---|---|---|
| 6,560,443 B1* | 5/2003 | Vaisanen et al. ........ | H04B 1/38 455/73 |
| 2005/0079903 A1* | 4/2005 | Taketomi ................. | H01Q 1/38 455/575.5 |
| 2009/0311976 A1* | 12/2009 | Vanderaa ............... | G08C 17/04 455/90.3 |
| 2011/0199267 A1* | 8/2011 | Hayashi .................. | H01Q 1/52 343/700 MS |
| 2012/0274523 A1* | 11/2012 | Ayatollahi ............. | H01Q 1/243 343/745 |
| 2014/0043201 A1* | 2/2014 | Pelosi .................... | H01Q 1/243 343/848 |
| 2015/0171916 A1* | 6/2015 | Asrani .................... | H04B 1/68 455/575.7 |
| 2015/0200448 A1* | 7/2015 | Tsai ....................... | H01Q 1/243 343/702 |
| 2016/0087328 A1* | 3/2016 | Lee ........................ | H01Q 5/307 343/702 |

FOREIGN PATENT DOCUMENTS

JP          2001-217624          8/2001

* cited by examiner

*Primary Examiner* — Kiet Doan
(74) *Attorney, Agent, or Firm* — Oblon, McClelland, Maier & Neustadt, L.L.P.

(57) ABSTRACT

Embodiments described herein relate a mobile communication device and techniques to suppress deterioration of antenna characteristics. The mobile device includes metallic members that are disposed around, or in portions of a casing of the mobile device. The metallic member is grounded directly to a ground plane of the mobile device at a first predetermined position. The grounded metallic member forms a stub line that cancels a flow of electric current though the metallic member. Furthermore, the metallic member is also connected to the ground plane, at a second predetermined location, via a resonant circuit. The mobile device is capable of adjusting a phase of the antenna current flowing through the device, when the mobile device is being operated by a user, and thus suppresses deterioration of antenna characteristics in certain desired frequency bands.

18 Claims, 11 Drawing Sheets

WHEN COMMUNICATION DEVICE IS NOT HELD BY HAND

WHEN COMMUNICATION DEVICE IS HELD BY HAND

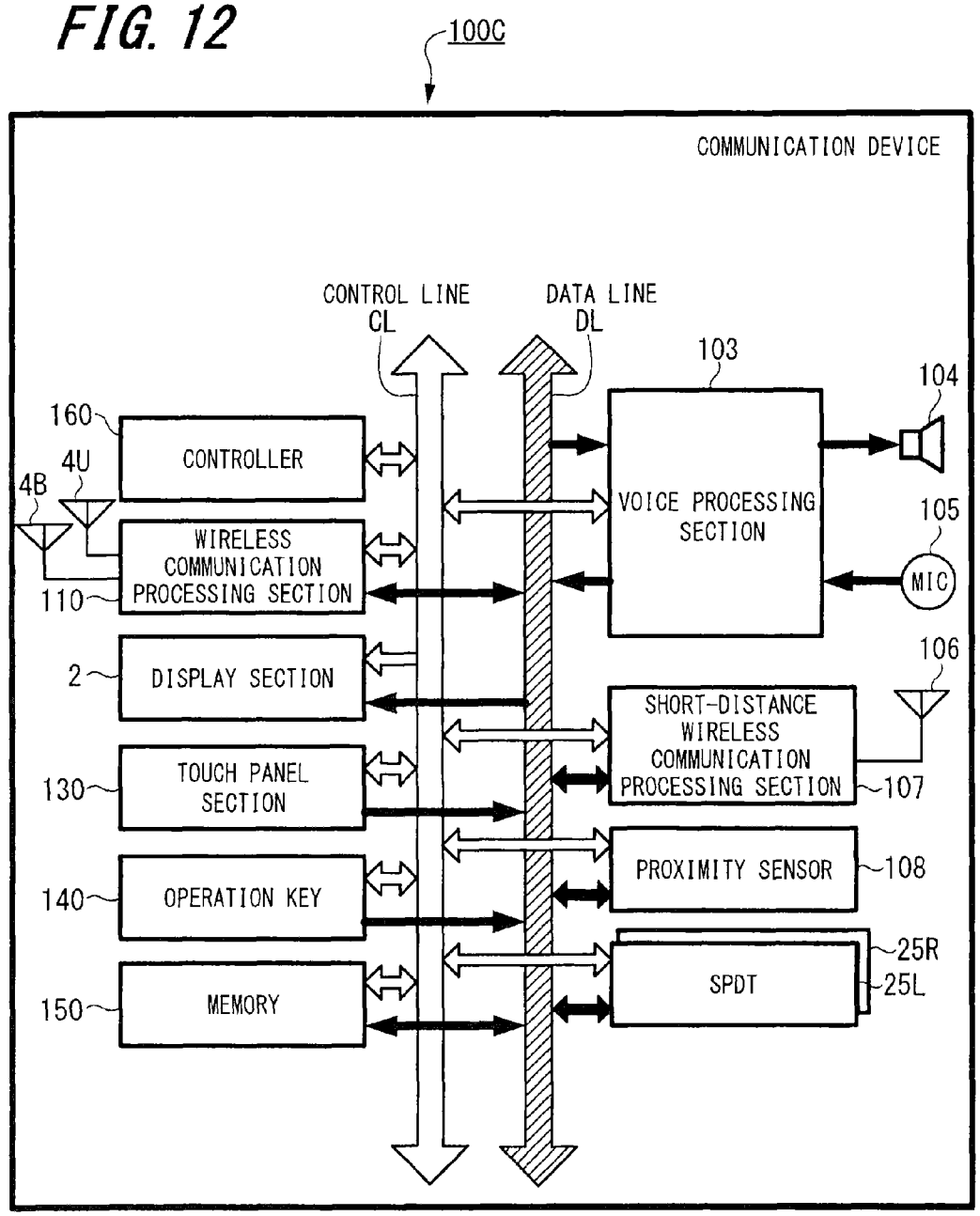

WHEN COMMUNICATION DEVICE IS NOT HELD BY HAND

WHEN COMMUNICATION DEVICE IS HELD BY HAND

MOBILE COMMUNICATION DEVICE

BACKGROUND

Field of the Disclosure

Embodiments described herein generally relate to a mobile communication device and techniques thereof for suppressing the deterioration of an antenna characteristics included in the mobile device.

Description of the Related Art

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Mobile devices, such as smart phones, tablets and the like are widely used. Such mobile devices generally include a case that serves as a protective covering for a display panel of the mobile device. The case includes metallic strips that are disposed on the circumference the case, thereby providing a compact mechanism to hold the case in a rigid manner and thus increasing the mechanical strength and durability of the mobile device.

However, when the metallic strips are included in the casing of a mobile device, the metallic strips pose a problem of deteriorating the characteristics/performance of an antenna that is included within the mobile device. Specifically, the metallic strips that are positioned in the vicinity of the antenna are susceptible to electromagnetic waves and provide a medium for transmitting electric currents. Thus, the antenna of the mobile device does not acquire a signal (electric current) of a desired magnitude which leads to poor performance of the mobile device. Further, the metallic strips pose the above described problem, when the mobile device is being operated by a user (i.e., the mobile device is in the user's hand), and also when the mobile device is not in use (i.e., when the mobile device is in a free space environment).

Accordingly, there is a requirement for a mobile device that does not deteriorate the antenna characteristics when the mobile case is surrounded by metallic strips.

SUMMARY

Embodiments discussed herein provide for a mobile device that suppresses the performance deterioration of antenna characteristics when the mobile device is being operated by a user and when the mobile device is in a free space environment.

Accordingly, one embodiment of the present disclosure provides a communication device that includes a casing and at least one metallic member disposed around the casing. The communication device further includes a ground plane that is directly connected by a connecting member to a first connection point on the at least one metallic member, wherein a transmission path between the first connection point and an open end of the metallic member has a resonant frequency within a first frequency band, in which performance deterioration of an antenna of the communication device is large when the communication device is being held by a user.

According to another embodiment is provided a communication device including a casing and at least one metallic member disposed around the casing and configured to operate as an antenna including a feed point disposed at one end of the metallic member. The device includes a ground plane that is directly connected by a connecting member to a first connection point on the at least one metallic member, wherein a transmission path between the first connection point and an open end of the metallic member has a resonant frequency within a first frequency band, in which performance deterioration of the antenna is large when the communication device is being held by a user.

Another embodiment provides a communication system that includes at least one antenna included in a communication device that is configured to communicate with other communication devices and at least one metallic member disposed around a casing of the communication device. The communication device also includes a ground plane directly connected by a connecting member to a first connection point on the at least one metallic member, wherein a transmission path between the first connection point and an open end of the metallic member has a resonant frequency within a first frequency band, in which performance deterioration of an antenna of the communication device is large when the communication device is being held by a user.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 illustrates an exemplary schematic block diagram depicting the internal structure of the mobile device;

DETAILED DESCRIPTION

Figure 1:
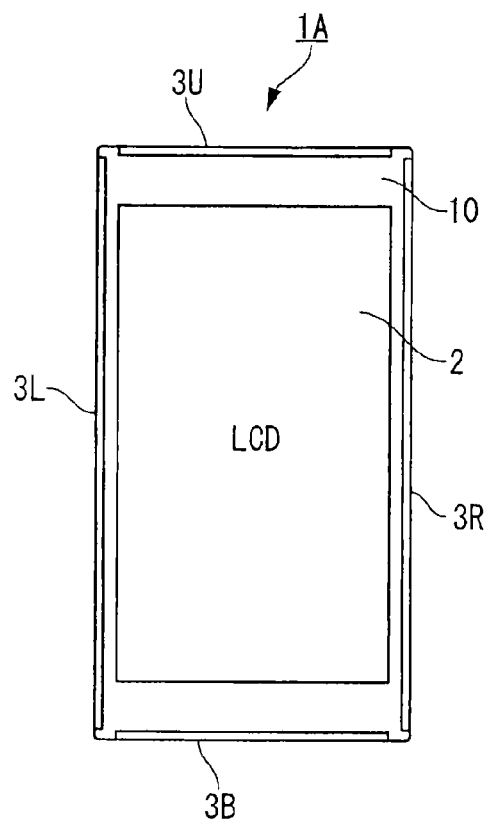
FIG. 1 illustrates a mobile device according to an embodiment.

Referring now to the drawings, wherein like reference numerals designate identical or corresponding parts throughout the several views.

FIG. 1 illustrates an exemplary mobile communication device 1A according to an embodiment. The mobile communication device 1A includes a display panel 2, such as a liquid crystal display panel that is configured to display text, images, video etc. on the mobile device. The display panel 2 is protected by a case 10. The case includes metallic strips (also referred to herein as metallic members) that are disposed on the circumference of the case 10. For instance, the mobile device 1A depicted in FIG. 1 includes metallic strips 3L, 3R, 3U, and 3B that are disposed on the left, right, upper (top) and lower (bottom) edges of the mobile device 1A. The mobile device 1A also includes a plurality of antennas that are configured to transmit and receive electromagnetic waves thereby enabling the mobile device to communicate with other devices. The antennas that are included in the mobile device 1A may be positioned within the device, towards the upper and lower edges of the mobile device. Details regarding the antenna structure are described later with reference to FIG. 3.

Figure 2:
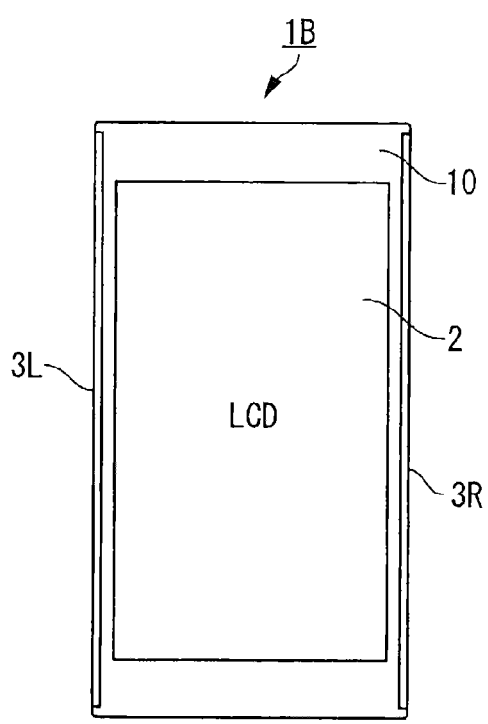
FIG. 2 illustrates an exemplary mobile device according to another embodiment.

FIG. 2 depicts an exemplary mobile device 1B according to another embodiment. The mobile device 1B includes a LCD display panel 2 that is protected with a case 10. The mobile device also includes a pair of metallic members 3L and 3R that are disposed on the circumference of the case 10 at the left and right edges, respectively. The presence of metallic members 3R, 3L, 3U, and 3B as shown in FIGS. 1 and 2 deteriorates the characteristics (performance) of the antenna of the mobile device. In order to minimize the deterioration of the antenna performance of such mobile devices, the metallic members disposed on the circumference of the case in such mobile devices can be entirely grounded as shown in FIG. 3-FIG. 5.

Figure 3:
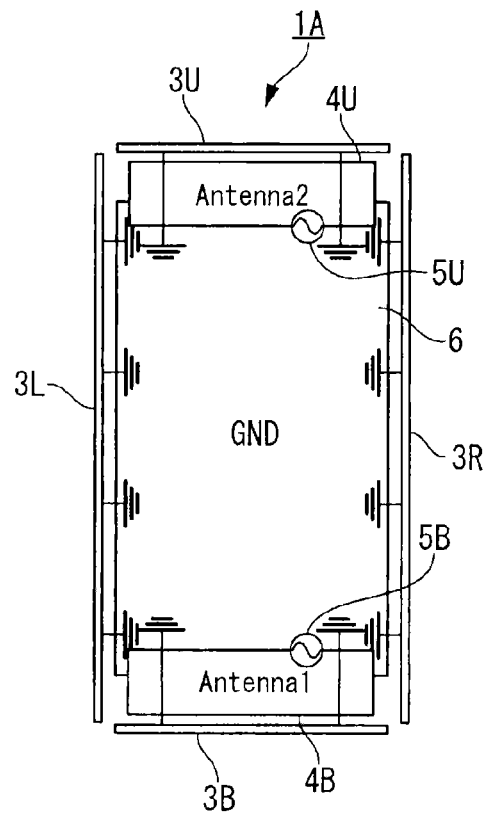
FIG. 3 illustrates a mobile device according to an embodiment.

FIG. 3 illustrates an exemplary schematic of the mobile device 1A according to another embodiment. For sake of illustration, the case 10 and the display panel 2 are not depicted in FIG. 3. The mobile device 1A includes metallic members 3R, 3L, 3B, and 3U disposed on the four edges of the case. Further, the mobile device 1A includes a first antenna 4B that is disposed near the lower edge of the mobile device and has a predetermined feed point 5B. The mobile device 1A also includes a second antenna 4U that has a predetermined feed point 5U and is positioned within the mobile device and disposed near the top edge of the mobile device. To suppress the deterioration of antenna characteristics caused by the metallic strips (3R, 3L, 3B, and 3U), the metallic strips are entirely grounded. Specifically, as shown in FIG. 3, each metallic strip is connected (via a connecting member, leaf spring etc.) at multiple locations, to a ground plane (GND) 6. The ground plane 6 may be a continuous conductor included in a single side of a double sided printed circuit board (PCB) or may be a single layer included in a multi-layered PCB. Therefore, the grounding of each metallic strip (at multiple locations along the length of the metallic strip) to the ground plane serves as a mechanism to counteract the deterioration of the antenna characteristics.

Figure 4:
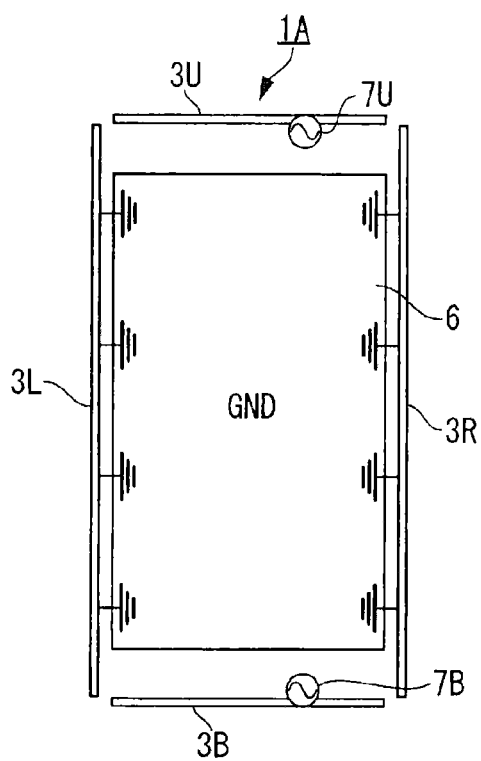
FIG. 4 illustrates another schematic of the mobile device according to an embodiment.

FIG. 4 depicts another schematic of the mobile device 1A according to another embodiment. In the mobile device 1A of FIG. 4, the left and right metallic members, 3L and 3R respectively, are grounded at multiple locations by a connecting member to the ground plane 6. In contrast to FIG. 3, the bottom and upper metallic members (3U and 3R) function as antennas that include predetermined feed points 7U and 7B, respectively.

Figure 5:
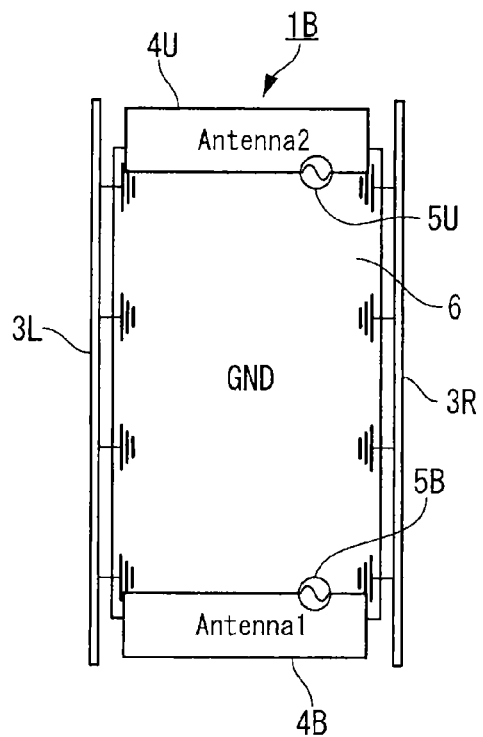
FIG. 5 depicts a schematic of the mobile device according an embodiment.

FIG. 5 depicts according to an embodiment a schematic of the mobile device 1B. The mobile device 1B includes metallic strips 3L and 3R that are positioned on the left and the right edges of the case of the mobile device. The mobile device 1B includes an antenna 4B (with a predetermined feed point 5B) that is positioned at a lower edge of the mobile device. Further the mobile device 1B also includes second antenna 4U that has a predetermined feed point 5U and is positioned at an upper edge of the mobile device. Each of the left and the right metallic strips, 3L and 3R respectively, are connected to a ground plane 6 via a connecting member at multiple locations along the metallic strip. The antennas 4U and 4B can have a flat shape and be disposed within the mobile device at the top edge and the bottom edge, respectively. Note that, the shape of antennas 4U and 4B is not limited to the flat shape, and any other suitable shape may be adopted. Furthermore, the antennas 4U and 4B can be arranged in a parallel fashion with respect to a printed circuit board that is included within the mobile device. By utilizing such a structure, wherein the metallic members 3L and 3R are grounded entirely by connection to the ground plane 6, the deterioration of the antenna characteristic in a free space environment (that is, when the mobile device is not operated by a user) is suppressed.

However, the problem of antenna characteristic deterioration still exists when the user operates the mobile device 1A and 1B (i.e., when the mobile device is in the hands of the user). The degradation in antenna characteristic incurred while the mobile device is operated by the user is much larger than the degradation incurred while the mobile device is in a free-space environment. The degradation is primarily caused due to an antenna current possibly flowing through the metallic members that lie on the circumference of the mobile case. The loss of electric current increases due to touching, directly by user's hand, when the mobile device is being operated by the user.

In what follows, several mechanisms to counteract the degradation of antenna characteristics are described with reference to FIG. 6-FIG. 15. In the following description, the terms metallic members and metallic strips is used interchangeably. The mobile device circumvents the problem of antenna deterioration when the mobile device is being operated by a user, as well as when the mobile device is in a free-space environment, by not grounding the metallic strips to the ground plane of the mobile device at a plurality of locations on the metallic strips. Rather, each metallic strip is formed as a stub (defined herein as a metallic strip that has an open end and a predetermined location along the strip that is connected to the ground plane) that provides resistance (high impedance) to the flow of electric current through the metallic members at certain desired frequencies. Furthermore, resonance circuits are disposed between the metallic strips and the ground plane at predetermined positions. Thus, using such configurations the phase of the antenna current that flows in the mobile device can be adjusted.

Additionally, the deterioration of the antenna characteristics caused in a mobile device that has at least one metallic strip disposed on the periphery of the mobile case is suppressed to a level that corresponds to the antenna characteristics of a mobile device that does not include any metallic strips. Furthermore, the deterioration of the antenna characteristics is suppressed for the case of the mobile device being operated by the user without changing the configuration of the metallic strips that are disposed around the mobile case.

Figure 6:
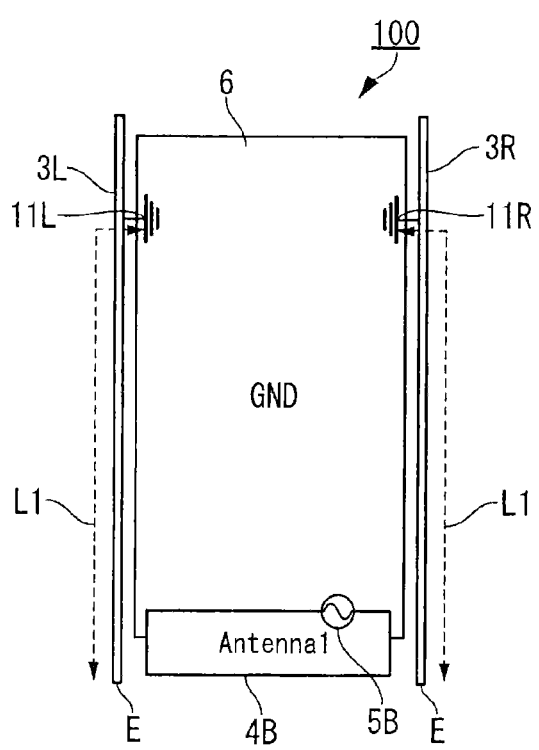
FIG. 6 illustrates an exemplary configuration of the mobile device that suppresses deterioration of antenna characteristics.

FIG. 6 illustrates an exemplary configuration of a mobile device 100 that provides improved antenna characteristics when the mobile device is being operated by the user.

In FIG. 6 the mobile device 100 includes a left metallic member 3L and a right metallic member 3R that are connected to the ground plane at pre-determined positions 11L and 11R, respectively. For sake of illustration the description of the case 10 and the display panel 2 (which are described with reference to FIG. 1) are omitted herein. Furthermore, although the mobile device 100 can be equipped with a first antenna 4B and a second antenna 4U (as shown in FIG. 3), the description provided herein is with respect to the first antenna 4B. The first antenna 4B is disposed within the mobile device 100 and is positioned at a lower edge of the mobile device. Thus, antenna 4B is closer to a user's hand (while the mobile device is in operation) then the second antenna which is disposed at an upper edge of the mobile device. Accordingly, the first antenna 4B has a greater influence on the antenna characteristics than the second antenna 4U, while the mobile device is being held in the user's hand and being operated by the user. Hence, in the following description, the deterioration of antenna characteristic is described with reference to only the first antenna 4B. Note however, that the mechanism of counteracting the deterioration of the antenna characteristic provided herein is equally applicable to the second antenna 4U.

For each metallic member 3L and 3R respectively, a location on the metallic member is determined wherein the metallic member is to be connected directly to a ground plane 6 via a connection member, leaf spring, or the like. For example, as shown in FIG. 6, the left metallic member 3L is connected directly to the ground plane 6 at a location (connection point) 11L. Similarly, the right metallic member 3R is connected directly to the ground plane at connection point 11R. Note that the ground connection points 11L and 11R (corresponding to the left metallic member 3L and the right metallic member 3R) are located further away from the location of the first antenna 4B (i.e., further away from the lower side which is more likely to be touched by a user's hand). In contrast to the metallic members 3L and 3R (of FIG. 5) that are connected to the ground plane at multiple locations, the metallic member 3L and 3R of FIG. 6 are each connected to the ground plane only at one predetermined location. Thus, the metallic members (3L and 3R) form a stub that provides resistance to the flow of electric current (through the metallic members) at a desired frequency band.

Specifically, the positions 11L and 11R of the ground connection points for the right and left metallic members forms a stub(defined herein as the path from the ground connection point 11L and 11R respectively, to the open end of the metallic members denoted by E). The length of the stub is such that phase of electric current entering the metallic members through the ground connection point 11R, is opposite to the phase of the electric current that flows in the connection points from the antenna feeding point 5B.

The length of each stub L1 is determined such that the transmission line has a resonant frequency that lies in a frequency range wherein the antenna characteristics tend to deteriorate. In a mobile telephone communication network, the antenna characteristics deteriorate in a low frequency range of 700 MHz to 1000 MHz. Thus, by setting length L1 appropriately such that the resonant frequency of the length of stub lies in the low frequency band, the phase of an electric current flowing into the open ends of the metallic members (E), through ground connection points 11R and 11L respectively, is opposite of the phase of the electric current that flows into the ground connection points from the feeding point of the antenna 5B. Therefore, in the low frequency band (in which the antenna characteristics have a large deterioration), the electric current flowing into the open ends of the metallic members (E), through ground connection points is cancelled by the electric current that flows into the ground connection points from the feeding point of the antenna 5B, thereby suppressing the deterioration of antenna characteristics when the mobile device is held by a user.

Figure 7:
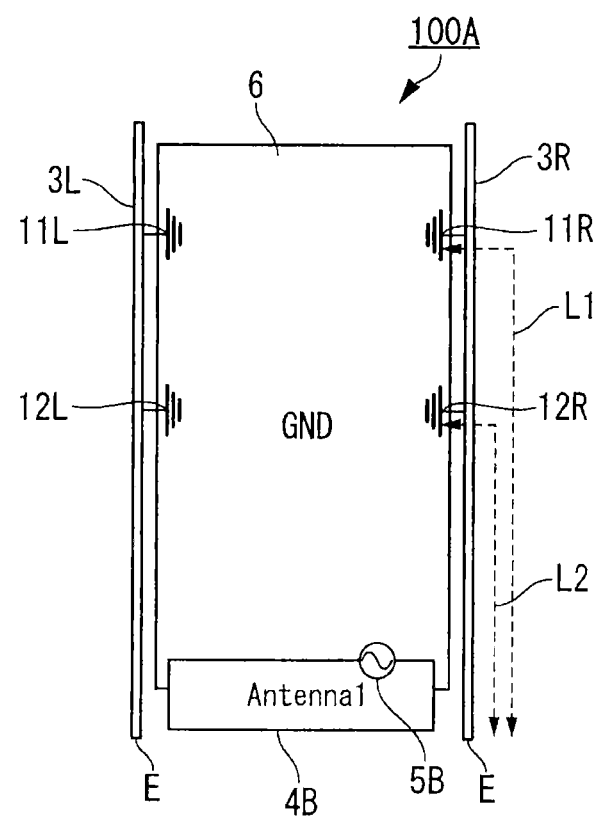
FIG. 7 illustrates according to another embodiment, a configuration of the mobile device that suppresses deterioration of antenna characteristics.

FIG. 7 depicts according to another embodiment, an exemplary mobile device 100A that improves antenna deterioration characteristics. The mobile device 100A includes a left metallic member 3L and a right metallic member 3R that are positioned on the left and right sides of the case 10 of the mobile device 100A. Each metallic member 3L and 3R are connected directly to the ground plane 6 at two predetermined locations. Specifically, the metallic members 3L and 3R are connected to the ground plane at connection points 11L and 11R. Further, each of the metallic members is grounded at a second predetermined position at connection points 12L and 12R respectively, thereby forming stub line of length L2. Similar to the location of the first predetermined positions 11L and 11R, that are positioned farther away from the location of the first antenna 4B, the location of the second predetermined positions 12L and 12R are also located away from the antenna 4B.

The length L2 of the stub lines can be determined such that the phase of the electric current flowing through the metallic members 3L and 3R from the open end E of the metallic members into the ground plane is opposite to the phase of the electric current flowing through the metallic members from the feeding point 5B into the ground plane. The length of the stub (location of connection point 11R) is determined based on the phase of the electric current flowing into L2. At this time, connection points 11L and 11R work as a part of stub. However, a path L1 does not exist, as the electric current flowing from connection point 11R is rather flowing into the ground plane 6 through connection point 12R and thus does not reach the open ends of the metallic members (E). Hence, the connection points 11L and 11R perform a function as impedance matching of stub. Specifically, if the impedance matches, the magnitude of the electric current flowing into stub expands and the effect of the stub becomes high. As described previously, the antenna characteristics tend to deteriorate in a low frequency band (700 MHz-1000 MHz). By ensuring that the resonating frequency of the transmission lines lie within the low frequency band, the flow of electric current into the ground connection points (11L, 11R, 12L, and 12R) is suppressed in the low frequency range when the mobile device is held by the user. Thus the configuration of the mobile device 100A as shown in FIG. 7 reduces/suppresses the deterioration of the antenna in the low frequency band and improves antenna performance FIG. 8A illustrates a graph depicting antenna characteristics when the user does not have the mobile device 100A in hand, i.e., the mobile device are in a free-space environment.

Figure 8A:
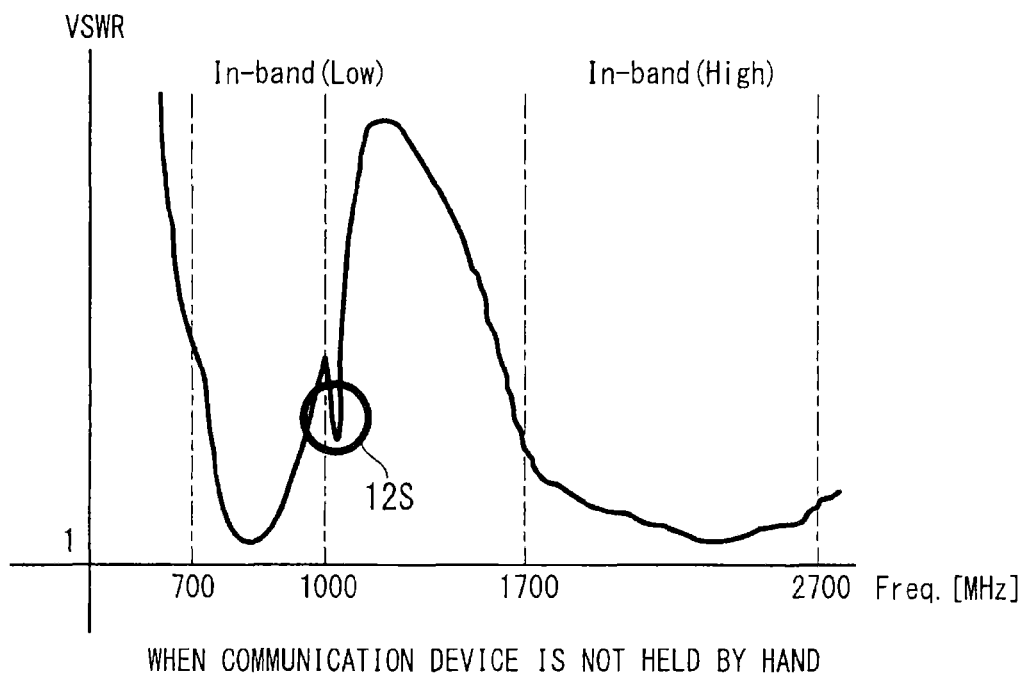
FIG. 8A and FIG. 8B depict a graph illustrating the performance of mobile device according to an embodiment.

The graph of FIG. 8A depicts frequency on the horizontal axis (X-axis) and a voltage standing wave ratio on the vertical axis (Y-axis). For a mobile device to deliver power to the antenna the impedance of the mobile device must be well matched to the impedance of the antenna. Voltage standing wave ratio (VSWR) is a measure that quantifies how well the impedance, of a transmission line (included within the mobile device) is matched to the impedance of the antenna.

FIG. 8A depicts a low in-band frequency range and a high in-band frequency range that correspond to the frequency ranges that are used for communication purposes by the mobile device 100A. For instance, a low frequency band of 700 MHz to 1000 MHz, and a high frequency band ranging from 1700 MHz to 2700 MHz can be used for communication purposes by the mobile device 100A. As shown in FIG. 8A, when the user does not have the mobile device 100A in hand, the effect of the stub line segment L2 (of FIG. 7) on the performance of the antenna is represented by portion 12S. Note that portion 12S lies in a frequency band that is higher than 1000 MHz and thus the antenna characteristics are not degraded.

Figure 8B:
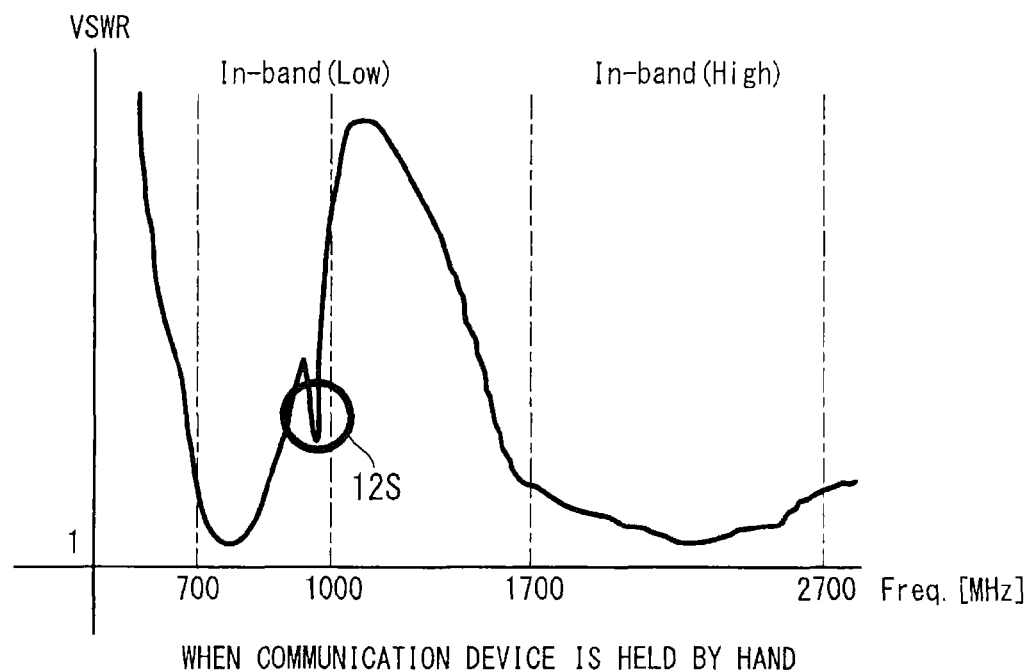

FIG. 8B depicts a graph illustrating the antenna characteristics when the user has the mobile device 100A in hand. When the mobile device 100A is operated by the user (that is the mobile device is in contact with the user's hand), the resonating frequency of the antenna and stub tends to shift towards the lower frequencies. Accordingly, the resonance portion 12S corresponding to the stub line segment of length L2, lies in the frequency range that is lower than 1000 MHz. Thus, by having the resonating frequency of the stub line L2 in the in-band low frequency range, antenna deterioration occurs when the user operates the mobile device in hand. Specifically, the stub line L2 configures the electric current flowing through the metallic members 3L and 3R from the connection point 12R of the metallic members into the open end E to have a phase that is opposite the phase of the electric current flowing into the connecting point (12L/12R) from the feeding point of the antenna.

Figure 9:
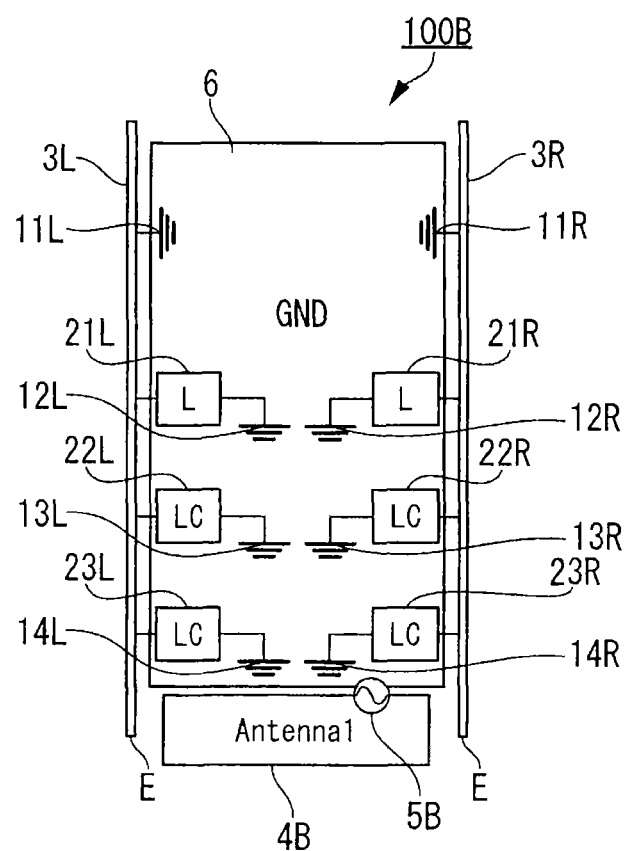
FIG. 9 illustrates according to another embodiment, an exemplary configuration of the mobile device that suppresses deterioration of antenna characteristics.

FIG. 9 depicts an exemplary mobile device 100B which improves deterioration of the antenna characteristics. The antenna characteristic in a free-space environment may deteriorate in a frequency band due the resonance generated by the metallic members that are arranged around the mobile case. Accordingly, as shown in FIG. 9, in order to circumvent the deterioration in the free-space environment, a resonance circuit (filter circuit) is provided between the metallic members and the ground plane 6. The resonance/filter circuits are configured in such a manner such that stub resonant frequencies lie in a frequency band that is not used for communication by the mobile device.

As shown in FIG. 9, the metallic member 3L is connected to the ground plane 6 at four predetermined locations 11L, 12L, 13L, and 14L. Note that, the number of ground plane 6 locations is not limited to four. Rather any other suitable number may be adopted, for example, three and more than four locations. Similarly the metallic member 3R is connected to the ground plane 6 at predetermined locations 11R, 12R, 13R, and 14R. The metallic member 3L is connected directly to the ground plane 6 at connection point 11L by a leaf spring etc. The metallic member 3L is connected to the ground connection point 12L via a inductor circuit 21L (capacitor may be used as well), whereas the metallic member 3L is connected to the ground connection points 13L and 14L via resonance circuits 22L and 23L respectively. The resonance circuits 22L and 23L can be formed by using a combination of an inductor and a capacitor. The resonance circuits are used for changing the resonant frequency of the stub.

In a low frequency band, the resonance circuits 22L and 23L cut off all low frequencies. Specifically, the resonance circuits 22L and 23L are determined such that it may be considered as having no resonance circuit 22L (ground connection point 13L) and resonance circuit 23L (ground connection point 14L). Thus, a stub line is formed from ground connection point 13L to the open ends of the metallic members (E) in lower frequency band. The stub line is adjusted by a capacitor and an inductor of the resonance circuit 21L. In a high frequency band, in the absence of the resonance circuit 23L and the ground connection point 14L, the resonance circuit 22L is determined so as not to enter the resonant frequency which is generated by path between the ground connection point 13L and the open ends of the metallic members (E) and which is generated by path between the ground connection point 13L and ground connection point 12L into a frequency range that is used for communication by the mobile device 100B. In case the resonance circuit 23L is present, the resonance circuits 22L and 23L are determined so as not to enter the resonant frequency which is generated by path between the ground connection point 13L and the ground connection point 14L and which is generated by path between the ground connection point 13L and ground connection point 12L, into a frequency range that is used for communication by the mobile device 100B. The resonance circuits 22L and 23L are configured to suppress the deterioration of the antenna characteristic in a high frequency band.

Similar to the configuration as described above with respect to metallic member 3L, the metallic member 3R included on the right edge of the mobile device 100B has four ground connection points 11R, 12R, 13R, and 14R. The length of each line segments for the metallic member 3R is similar to the transmission line segments of the metallic member 3L.

The inductors 21L and 21R shift the resonant frequency of the stub (i.e., the inductors can be used to fine tune the stub resonance frequency). The electric current that flows into the metallic member 3L (3R) in a frequency band (for instance a high frequency band) is transferred to the ground plane 6, whereas the electric current flowing through the metallic members in another frequency band, for instance a low frequency band is cut off. The performance of the antenna of the mobile device 100B is described later with reference to FIGS. 10A-10C. Furthermore, the stub line has resonance circuits 23L and 23R at ground connecting point and may resonate, for example, at a second harmonic resonance frequency of stub resonance. Thus, the stub line can respond to a second harmonic and it may be in communication frequency range, but the second harmonic resonance frequency of stub line can be tuned by using 23L and 23R.

Furthermore, the configuration of the resonant circuits is in no manner restricted to be the configuration as depicted in FIG. 9. Other variations of the resonance circuits may be implemented within the mobile device to counteract the deterioration of the antenna characteristics. For instance, the resonance circuits (including capacitors and inductors) may be achieved as a lump constant circuit or a distributed constant circuit.

Figure 10A:
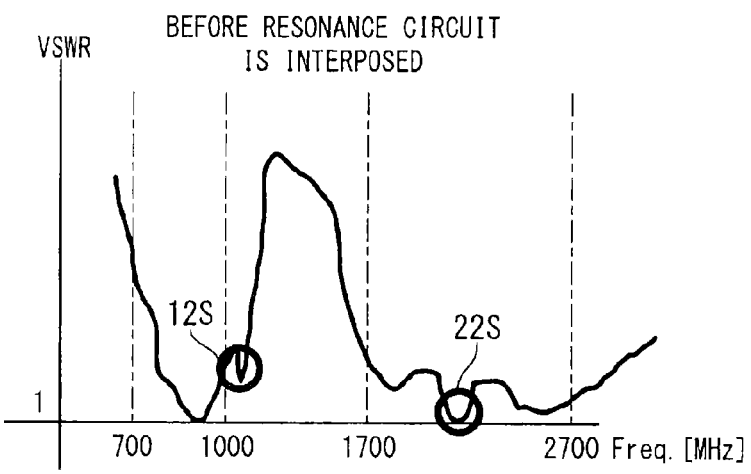
FIGS. 10A 10C depict a graph illustrating the performance of the mobile device according to another embodiment.

FIG. 10A illustrates a graph depicting the antenna characteristics of the mobile device in a free space environment when the resonance circuits 22L, 23L (22R and 23R) of FIG. 9 are not provided in the mobile device 100B. As shown in FIG. 10A, the effect of resonance of the transmission line (caused by the metallic strip being grounded directly at connection point 11L and at connection point 12L via the inductor 21L) is depicted as portions 12S and 22S respectively. The portions 12S and 22S appear in a frequency band higher than 1000 MHz and in the high frequency band greater than 1700 MHz respectively.

Figure 10B:
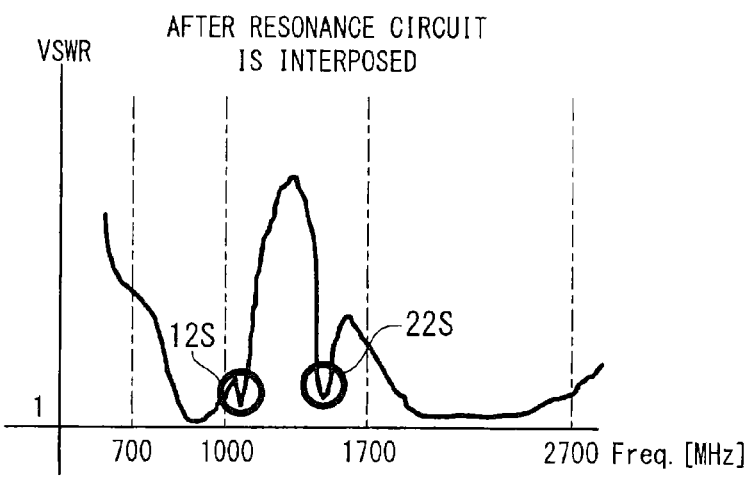

FIG. 10B depicts the antenna characteristics when the mobile device 100B is not operated by the user (that is in a free space environment). However, in this case the mobile device 100B is provided with the resonance circuits 22L, 23L, 22R, and 23R. After the insertion of the resonance circuits in the mobile device, the resonance portion 22S is shifted in a frequency band that is not used for communication by the mobile device. In this example, the resonance portion 22S is shifted in a frequency band lower than 1700 MHz. Alternatively, the resonance portion 22S can be shifted in a frequency band higher than 2700 MHz. This phenomenon occurs as the resonant circuits 22L, 23L, 22R, and 23R are configured to have a stub resonating frequency that lies in a frequency band that is not used for communication by the mobile device. Further, the resonance portion 12S does not change considerably in comparison to the location of the resonance portion 12S as depicted in FIG. 10A.

Figure 10C:
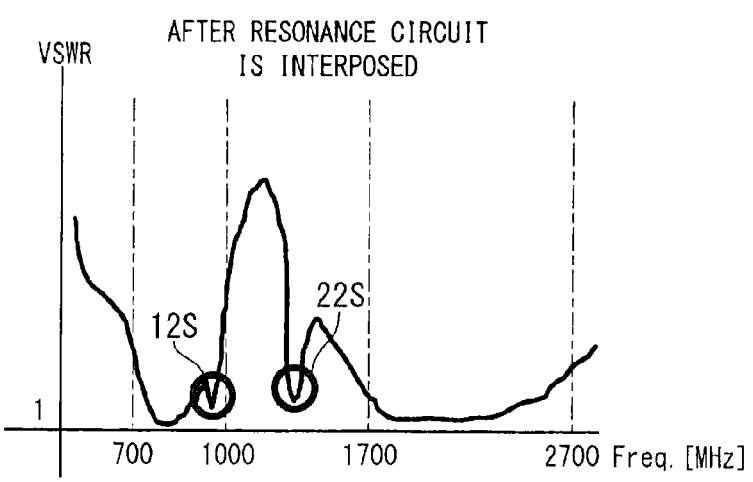

FIG. 10C depicts a graph illustrating the characteristics of the antenna when the mobile device 100B is equipped with the resonance circuits 22L, 23L, 22R, and 23R, and the mobile device is being operated by the user. When the mobile device is in the hands of the user, the antenna phase tends to shift in a direction of lower frequency. As described previously with reference to FIG. 8B, when the user operates the mobile device, a flow of electric current through the metallic members is suppressed by the resonance of the stub lines. Comparing the performance of the VSWR of portion 12S in FIG. 8B and portion 12S in FIG. 10C, the inclusion of the LC resonance circuits 22L, 22R, 23L, and 23R achieves a better VSWR and furthermore suppresses deterioration of the antenna in the high-frequency band when the mobile device is in the free-space environment.

Figure 11:
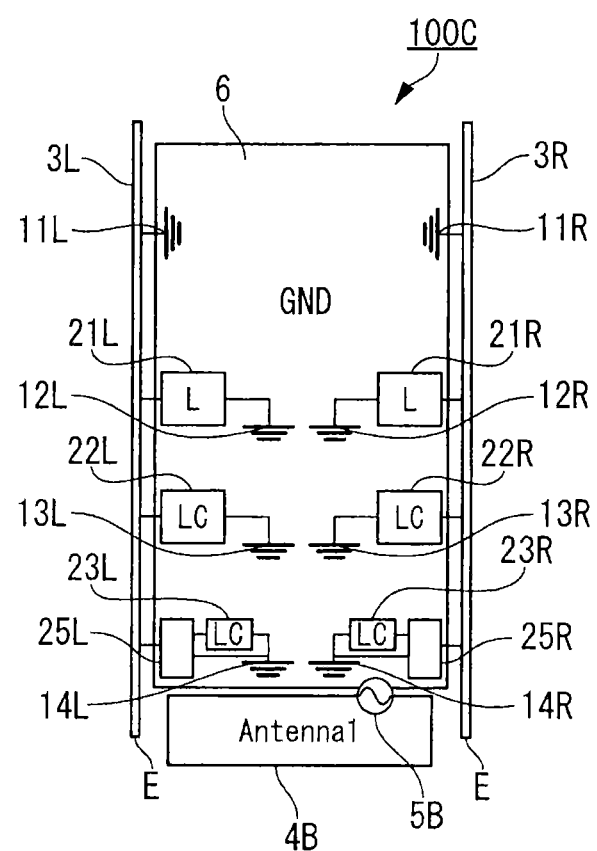
FIG. 11 depicts according to another embodiment, a configuration of a mobile device to improve antenna characteristics.

FIG. 11 depicts according to another embodiment, a configuration of a mobile device 100C that improves antenna characteristics when the mobile device is being operated by a user. In FIG. 11 the mobile device 100C includes metallic members 3L and 3R that are each connected to the ground plane 6 at four predetermined connection points. Specifically, the metallic member 3L is connected directly to the ground plane 6 via connecting member (leaf spring etc,) at the connection point 11L. The metallic member 3L is connected to the ground plane 6 at connection points 12L, 13L, and 14L via an inductor or capacitor or an inductor-capacitor resonance circuit. The metallic member 3R is connected to the ground plane 6 in a similar fashion to that of metallic member 3L.

The mobile device 100C of FIG. 11 includes a single pole double throw switch, 25L, that is interposed between the metallic member 3L and the resonance circuit 23L. As shown in FIG. 11, the switch 25L is connected to the ground plane at 14L by the resonance circuit 23L and by a direct connection via a leaf spring etc. Accordingly, the metallic member 3L (and similarly metallic member 3R) can be connected to the ground plane either directly or through the resonance circuit 23L.

According to an embodiment of the present disclosure, the SPDT switch is configured to change the manner in which the metallic member 3L is connected to the ground connection point 14L, and thereby change the resonance frequency of the stub line through the connection point 14L. Specifically, when the mobile device 100C is not being operated by the user, the metallic member 3L is connected to the ground connection point 14L directly by a connecting member. In case of the resonant frequency which is generated by path between the ground connection point 14L and the open ends of the metallic members (E) enter into a frequency range that is used for communication by the mobile device 100B, it can be tuned by using an inductor and a capacitor, not directly connect metallic member 3L with the ground connection point 14L. However, when the mobile device 100C is operated by the user, the metallic member 3L is connected to the ground connection point 14L via the resonance circuit 23L. The mobile device 100C can be configured to determine whether the user is operating the mobile device 100C, for instance, by using a proximity sensor to detect how close the mobile device is from the user, a sensor to detect a change in the impedance of an antenna that is caused by a user operating the mobile device, a touch sensor that is configured to detect a touch operation on the LCD panel of the mobile device or by any other similar means. Such detection mechanisms can be monitored and processed by a processing circuit included in the mobile device. Furthermore, the metallic member 3R is connected to the ground connection point 14R using a configuration similar to that as described above with respect to the ground connection point 14L. In other words, an SPDT switch is connected in a parallel manner with respect to the resonance circuit 23R, thereby providing a mechanism of connecting the metallic member 3R to the ground connection point 14R (either directly or via the resonance circuit) based on whether the mobile device 100C is operated by the user or not.

Furthermore, the SPDT switch could also be arranged in a parallel manner with respect to the resonance circuits 22L and 22R. The performance of the antenna characteristic of the mobile device 100C is described later with reference to FIGS. 13A and 13B.

FIG. 12 illustrates an exemplary schematic block diagram depicting the internal structure of the mobile device 100C. As shown in FIG. 12, the mobile phone terminal device 100C may include antennas 4U and 4B, and a wireless communication processing section 110. The wireless communication processing section 110 may communicate wirelessly via radio signals, or the like, with other mobile devices via, e.g., a base station. Further, a data signal, such as a voice transmission from another user, may be received by the antennas is sent to the wireless communication processing section 110 for further processing. In the case of an incoming voice transmission, the voice data signal may be sent from the wireless communication processing section 110 to a voice processing section 103. Incoming voice data received by the voice processing section 103 via the wireless communication processing section 110 may be output as sound via a speaker 104.

Conversely, an outgoing voice signal may be supplied by a user to the voice processing section 103 via a microphone 105. The voice signal received via microphone 105 and processed by the voice processing section 103 may be sent to wireless communication processing section 110 for transmission by the antennas.

A second antenna 106 may be supplied for use with a short distance wireless communication processing section 107. The short distance wireless communication processing section 107 may communicate wirelessly with other devices over a network, such as the Internet, a local area network (LAN), or a wide area network (WAN). The second antenna 106 may, e.g., by a Wi-Fi transceiver.

A proximity sensor 108 may be provided in the mobile phone terminal device 100C. The sensor 108 may be a motion sensor that detects a motion of an object in the proximity of the mobile phone terminal device 100. The motion may correspond to a user moving an instruction object, such as a finger or stylus in the proximity of the mobile phone terminal device 100C. The proximity sensor may be configured to determine whether the mobile device 100C is being operated by the user, i.e., being held in the user's hand or whether the mobile device is in a free space environment i.e., the user is not operating the mobile phone.

The mobile phone terminal device 100C may include a display 2. The display 2 may be, e.g., liquid crystals display (LCD) panel, an organic electroluminescent (OLED) display panel, a plasma display panel, or the like. The display 2 may display text, an image, a web page, a video, or the like. For example, when the mobile phone terminal device 100C connects with the Internet, the display 2 may display text and/or image data which is transmitted from a web server in Hyper Text Markup Language (HTML) format and displayed via a web browser. The display 2 may additionally display data stored in a memory 150.

A touch panel unit 130 can detect a touch operation on the surface of the display 2. For example the touch panel 130 can detect a touch operation performed by an instruction object, such as a finger or stylus. Touch operations may correspond to user inputs, such as a selection of an icon or a character string displayed on the display 2. The touch panel 130, may be an electrostatic capacitance type device, a resistive type touch panel device, or the like which can be used for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 2 while moving the instruction object around the display 120, e.g., a "swipe" operation. The touch panel section 130 may output a signal based on a classification of the touch operation performed. The signal may, for example include information indicating the touch operation classification, the location on the display 2 where the touch operation was performed, and the operation to be performed based on the touch operation.

Data which is detected and processed by the touch panel 130 can be transmitted to a controller 160. The controller 160 may include one or more processor units and can control each element of the mobile phone terminal device 100C based on data detected by the touch panel 130, or by inputs received from operation key 140. The operation key 140 may receive inputs from external control buttons included with the mobile phone terminal device 100C. The external control buttons may be buttons configured to control the volume, switch ON/OFF the power, or perform a hold operation for the mobile phone terminal device 100.

The controller 160 may execute instructions stored in the memory 150. To this end, the memory 150 may be a non-transitory computer readable medium having instructions stored therein for controlling the mobile phone terminal device 100C. Further, the controller 160 may include one or more processors for executing the instructions stored on the memory 150. The memory 150 may additionally store information pertaining to the determined locations at which the metallic members are connected to a ground plane included in the mobile device 100C. Further, according to one aspect, the controller 160 may utilize the instructions stored in the memory 150, to be executed on the mobile phone terminal device 100C. However, the processing features of the controller 160 are not limited to using such information, and other methods of performing these features may be utilized.

Furthermore, the mobile device 100C includes a single pole double throw switch 25R and 25L that may be configured to switch the mechanism as to how a metallic member that surrounds the case of the mobile device 100C is connected to the ground plane of the mobile device based on information obtained from the proximity sensor. For instance, when the proximity sensor detects that the mobile device 100C is not being operated by a user, i.e., the sensor determines that the mobile phone 100C is not positioned in the user's hands, the SPDT switches may be configured to directly ground the metallic members to the ground plane. In contrast, when the mobile phone 100C determines (by the proximity sensor) that the mobile phone is in use i.e. in the hand of the user, the SPDT switches may be figured to connect the metallic member of the mobile device 100C to the ground plane via a resonance circuit.

The mobile phone terminal device 100C can include a control line CL and a data line DL as internal bus lines for communication. The control line CL can be used to transmit control data from the controller 160. The data line DL may be used for the transmission of voice data, display data, or the like, throughout the various elements of the mobile phone terminal device 160.

Figure 13A:
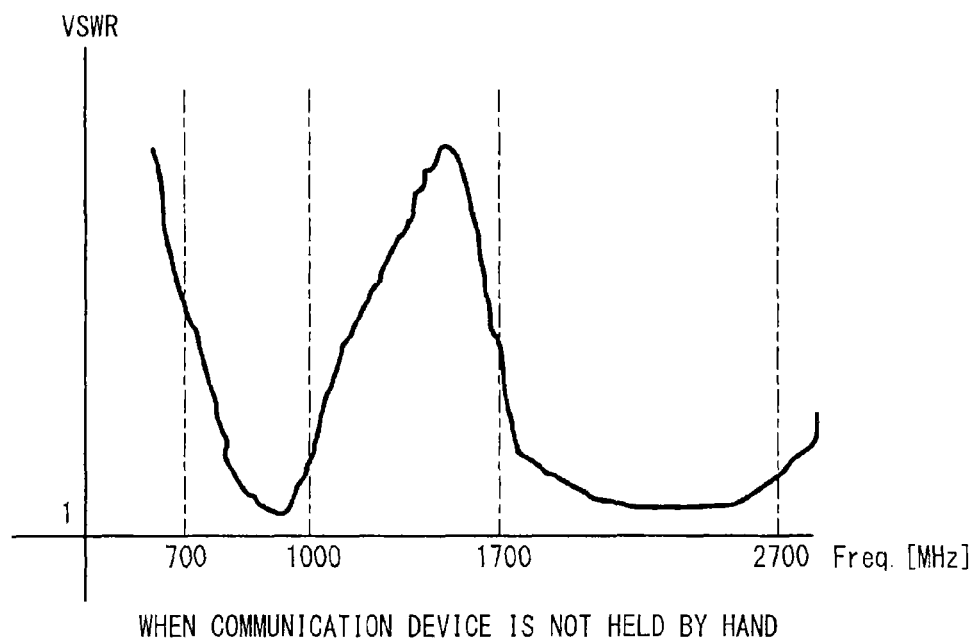
FIG. 13A and FIG. 13B depict a graph illustrating the performance of the mobile device according to another embodiment.

FIG. 13A depicts a graph illustrating the antenna characteristics of the mobile device 100C when the mobile device is not operated by the user (i.e., the mobile device is in a free space environment). When the mobile device 100C is not placed in the hands of the user, the SPDT switch is configured to directly connect the metallic members 3L and 3R to the ground plane 6. As shown in FIG. 13A, the antenna VSWR do not have a distortion in both the low frequency band and the high frequency band when the mobile device 100C is not being held by the user.

Figure 13B:
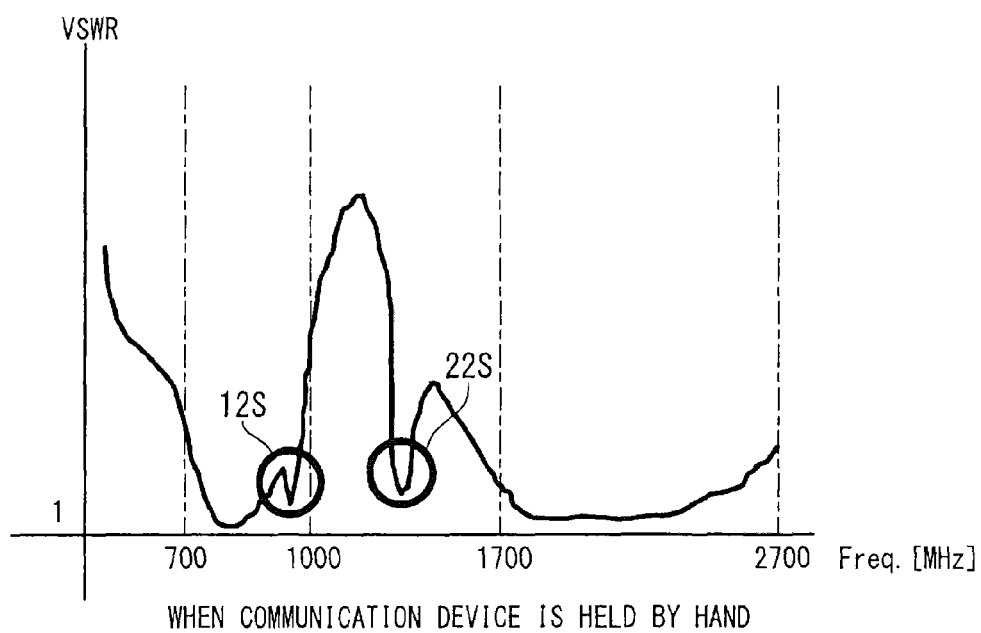

When a user operates the mobile device 100C, the SPDT switches 25L and 25R included in the mobile device 100C are configured to connect the metallic members 3L and 3R to the ground plane 6 via the resonance circuits 23L and 23R respectively. Note that in this case, the grounding of the mobile device 100C is similar to that of the mobile device 100B as described with reference to FIG. 9. Thus, the antenna characteristics as depicted in FIG. 13B are similar to the antenna characteristics as depicted in FIG. 10C.

Figure 14:
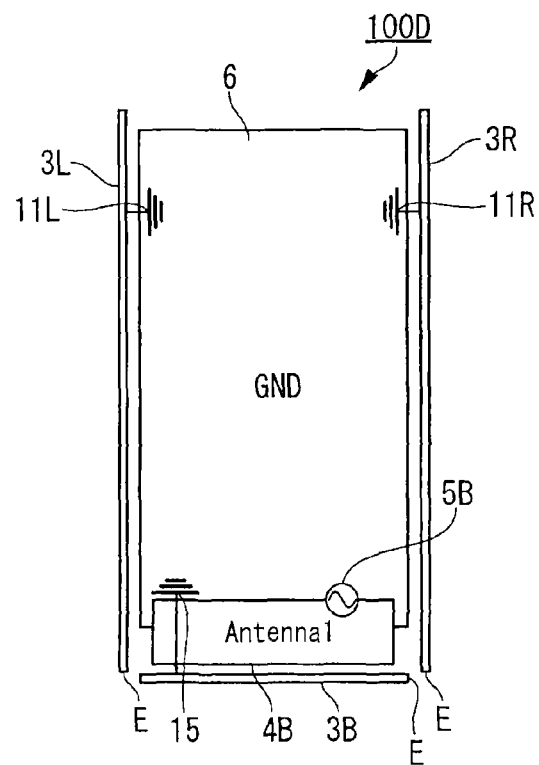
FIG. 14 illustrates a mobile device according to another embodiment.

FIG. 14 depicts an exemplary mobile device 100D that improves the antenna characteristics, when the mobile device is operated by the user. Similar to the mobile device 100 depicted in FIG. 6, the mobile device 100D as shown in FIG. 14, includes a metallic member 3L and a metallic member 3R that are disposed on the left and the right edges of the casing of the mobile device. The metallic members 3L and 3R are grounded to a ground plane 6 at connection points 11L and 11R respectively. The mobile device 100D also includes a metallic member 3B that is disposed at a bottom edge of the casing. The metallic member 3B is connected to the ground plane at a connection point 15 that lies further away from the feed point 5B of the antenna 4B that is disposed at the lower edge (and positioned within) of the mobile device. Thus, upon grounding the metallic member 3B to the ground plane 6 at the predetermined connection point 15, the phase of the electric current that flows from the connection point 15 into the open end E of the metallic member 3B is reversed as compared to the phase of the electric current that flows into the connection point 15 from the feeding point 5B of the antenna. Thus, an electric current is suppressed from flowing in the metallic member 3B, thereby improving the antenna characteristic at the time the mobile device 100D is operated by the user.

Figure 15:
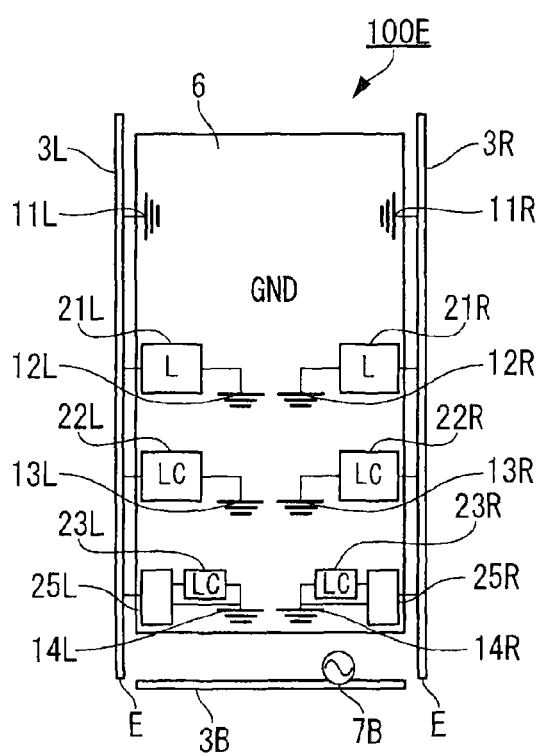
FIG. 15 depicts according to another embodiment an exemplary mobile device.

FIG. 15 depicts according to another embodiment, an exemplary mobile device 100E that improves antenna characteristics at the time instant the mobile device is operated by the user. The configuration of the mobile device 100E depicted in FIG. 15 is similar to the configuration of the mobile device 100C depicted in FIG. 11. However the mobile device 100E includes a bottom metallic member 3B that is configured to function as an antenna with a feed point 7B. Accordingly, the antenna characteristics of the mobile device 100E are similar to the antenna characteristics of the mobile device 100C, as depicted in FIGS. 13A and 13B.

Obviously, numerous modifications and variations of the present invention are possible in light of the above teachings. It is therefore to be understood that within the scope of the appended claims, the invention may be practiced otherwise than as specifically described herein. For example, devices other than the mobile phone device can implement the mechanism described herein to counteract the deterioration of antenna characteristics. For example, aspects of the present disclosure may be executed on a smart phone, a tablet, a general purpose computer, a laptop, an electronic reading device, or other such display terminals.

Additionally, in the embodiments described above the metallic members that are arranged around the case of the mobile device may be connected to the ground plane using any combination of the ground connections (either directly or via resonance circuits) described herein. Thus, the deterioration on antenna characteristics at the time the mobile device is operated by the user is suppressed to a level that corresponds to the scenario wherein the mobile case does not include any metallic members. Furthermore, the deterioration of the antenna characteristics of the mobile device is suppressed without changing the arrangement of the metallic members that are disposed around the mobile case.

The above disclosure also encompasses the embodiments noted below.

(1) A communication device comprising: a casing; at least one metallic member disposed around the casing; and a ground plane directly connected by a connecting member to a first connection point on the at least one metallic member, wherein a path between the first connection point and an open end of the metallic member has a resonant frequency within a first frequency band, in which performance deterioration of an antenna of the communication device is large when the communication device is being held by a user.

(2) The communication device of (1), wherein the open end of the metallic member is positioned near the antenna of the communication device and the first connection point on the metallic member is located away from the open end of the metallic member.

(3) The communication device of (1), wherein the first frequency band has a range of 700 MHz to 1000 MHz.

(4) The communication device of (1), wherein the ground plane is connected to a second connection point on the at least one metallic member by an inductor.

(5) The communication device of (4), wherein the second connection point on the metallic member is located closer to the open end of the metallic member than the first connection point.

(6) The communication device of (1), wherein the ground plane is connected to a third connection point on the at least one metallic member by a resonance circuit.

(7) The communication device of (6), wherein the resonance circuit includes at least an inductor and a capacitor.

(8) The communication device of (7), wherein a stub has a resonant frequency within a second frequency band that is not used for communication.

(9) The communication device of (6), wherein the third connection point on the metallic member is closer to the open end of the metallic member than the second connection point.

(10) The communication device of (8), wherein the second frequency band includes frequencies greater than 1000 MHz and frequencies less than 1700 MHz.

(11) The communication device of (6), further comprising: a switch configured to change a connection route of the third connection point to the ground plane.

(12) The communication device of (11), further comprising: circuitry configured to: detect a location of the mobile device; and control the switch to change the connection route of the third connection point to the ground plane based on the detection.

(13) The communication device of (12), wherein the circuitry is configured to connect the third connection point directly to the ground plane of the communication device, when the circuitry detects that the communication device is in a free-space environment.

(14) The communication device of (12), wherein the circuitry is configured to connect the third connection point to the ground plane of the communication device via the resonance circuit, when the circuitry detects that the communication device is in the hands of a user.

(15) The communication device of (11), wherein the switch is a single-pole double throw switch.

(16) The communication device of (14), wherein the circuitry detects whether the communication device is in the hands of the user by one of a proximity sensor configured to detect closeness of the communication device to the user, a sensor configured to detect a change in an impedance of an antenna included in the communication device, and a touch sensor configured to detect a touch operation on an LCD panel of the communication device.

(17) The communication device of (1), wherein a first metallic member is disposed on a right edge of the casing and a second metallic member is disposed on a left edge of the casing.

(18) The communication device of (17), further comprising: a third metallic member disposed on a bottom edge of the casing.

(19) A communication device comprising: a casing; at least one metallic member disposed around the casing and configured to operate as an antenna including a feed point disposed at one end of the metallic member; and a ground plane directly connected by a connecting member to a first connection point on the at least one metallic member, wherein a transmission path between the first connection point and an open end of the metallic member has a resonant frequency within a first frequency band, in which performance deterioration of the antenna is large when the communication device is being held by a user.

(20) A communication system comprising: at least one antenna included in a communication device that is configured to communicate with other communication devices; at least one metallic member disposed around a casing of the communication device; and a ground plane directly connected by a connecting member to a first connection point on the at least one metallic member, wherein a transmission path between the first connection point and an open end of the metallic member has a resonant frequency within a first frequency band, in which performance deterioration of an antenna of the communication device is large when the communication device is being held by a user.

The invention claimed is:

1. A communication device comprising:
   a casing;
   an antenna;
   at least one metallic member disposed around the casing and provided separately from the antenna;
   a ground plane directly connected by a connecting member to a first connection point on the at least one metallic member to define an open end of the at least one metallic member and a transmission path between the first connection point and the open end, the transmission path having a resonant frequency, such that the resonant frequency of the transmission path does not enter within a first frequency band in which the communication device operates; and
   a resonance circuit by which the ground plane is connected to a third connection point on the at least one metallic member, the resonance circuit having a stub resonating frequency that lies in a second frequency band that is not used for communication by the mobile device.

2. The communication device of claim 1, wherein the open end of the at least one metallic member is positioned near the antenna of the communication device and the first connection point on the at least one metallic member is located away from the open end of the at least one metallic member.

3. The communication device of claim 1, wherein the first frequency band has a range of 700 MHz to 1000 MHz.

4. The communication device of claim 1, wherein the ground plane is connected to a second connection point on the at least one metallic member by an inductor.

5. The communication device of claim 4, wherein the second connection point on the at least one metallic member is located closer to the open end of the at least one metallic member than the first connection point.

6. The communication device of claim 1, wherein the resonance circuit includes at least an inductor and a capacitor.

7. The communication device of claim 1, wherein the third connection point on the at least one metallic member is closer to the open end of the at least one metallic member than the second connection point.

8. The communication device of claim 1, wherein the second frequency band includes frequencies greater than 1000 MHz and less than 1700 MHz.

9. The communication device of claim 1, further comprising:
   a switch configured to change a connection route of the third connection point to the ground plane.

10. The communication device of claim 9, further comprising:
    circuitry configured to
    detect a location of the mobile device; and
    control the switch to change the connection route of the third connection point to the ground plane based on the detection.

11. The communication device of claim 10, Therein the circuitry is configured to connect the third connection point directly to the ground plane of the communication device, when the circuitry detects that the communication device is in a free-space environment.

12. The communication device of claim 10, wherein the circuitry is configured to connect the third connection point to the ground plane of the communication device via the resonance circuit, when the circuitry detects that the communication device is in the hands of the user.

13. The communication device of claim 12, wherein the circuitry detects whether the communication device is in the hands of the user by one of a proximity sensor configured to detect closeness of the communication device to the user, a sensor configured to detect a change in an impedance of an antenna included in the communication device, and a touch sensor configured to detect a touch operation on an LCD panel of the communication device.

14. The communication device of claim 9, wherein the switch is a single-pole double throw switch.

15. The communication device of claim 1, wherein a first metallic member is disposed on a right edge of the casing and a second metallic member is disposed on a left edge of the casing.

16. The communication device of claim 15, further comprising:
    a third metallic member disposed on a bottom edge of the casing.

17. A communication device comprising:
    a casing;
    a plurality of metallic members disposed around the casing, including a first metallic member configured to operate as an antenna including a feed point disposed at one end of the first metallic member and a second metallic member provided separately from the first metallic member;
    a ground plane directly connected by a connecting member to a first connection point on the second metallic member to define an open end of the second metallic member and a transmission path between the first connection point and the open end, the transmission path having a resonant frequency, such that the resonant frequency of the transmission path does not enter within a first frequency band in which the communication device operates; and
    a resonance circuit by which the ground plane is connected to a third connection point on the second metallic member, the resonance circuit having a stub resonating frequency that lies in a second frequency band that is not used for communication by the mobile device.

18. A communication system comprising:
    at least one antenna included in a communication device that is configured to communicate with other communication devices;
    at least one metallic member disposed around a casing of the communication device and provided separately from the at least one antenna;
    a ground plane directly connected by a connecting member to a first connection point on the at least one metallic member to define an open end of the at least one metallic member and a transmission path between the first connection point and the open end, the transmission path having a resonant frequency, such that the resonant frequency of the transmission path does not enter within a first frequency band in which the communication device operates; and
    a resonance circuit by which the ground plane is connected to a third connection point on the at least one metallic member, the resonance circuit having a stub resonating frequency that lies in a second frequency band that is not used for communication by the mobile device.

* * * * *